United States Patent [19]

Schwelling

[11] Patent Number: 5,044,270
[45] Date of Patent: Sep. 3, 1991

[54] SHREDDER AND COMPACTOR WITH PROTECTIVE GUARD

[75] Inventor: Hermann Schwelling, Salem, Fed. Rep. of Germany

[73] Assignee: H S M - Pressen GmbH, Salem, Fed. Rep. of Germany

[21] Appl. No.: 422,559

[22] Filed: Oct. 17, 1989

[30] Foreign Application Priority Data

Oct. 18, 1988 [DE] Fed. Rep. of Germany ....... 3835450

[51] Int. Cl.⁵ .............................................. B30B 15/08
[52] U.S. Cl. ........................................ 100/53; 100/97; 100/100; 100/255
[58] Field of Search ................................... 100/94–97, 100/53, 100, 102, 255

[56] References Cited

U.S. PATENT DOCUMENTS

| | | | |
|---|---|---|---|
| 2,691,338 | 10/1954 | Robbins | 100/97 |
| 3,754,498 | 8/1973 | Gil | 100/97 X |
| 3,754,500 | 8/1973 | Heth | 100/97 |
| 3,988,980 | 11/1976 | Walker | 100/53 |

Primary Examiner—Harvey C. Hornsby
Assistant Examiner—Stephen F. Gerrity
Attorney, Agent, or Firm—Nils H. Ljungman & Associates

[57] ABSTRACT

Protective cover for a combined shredder and compactor. The protective cover is adapted to assume a position to limit access to the cutter of the shredder when the shredder is operating.

6 Claims, 3 Drawing Sheets

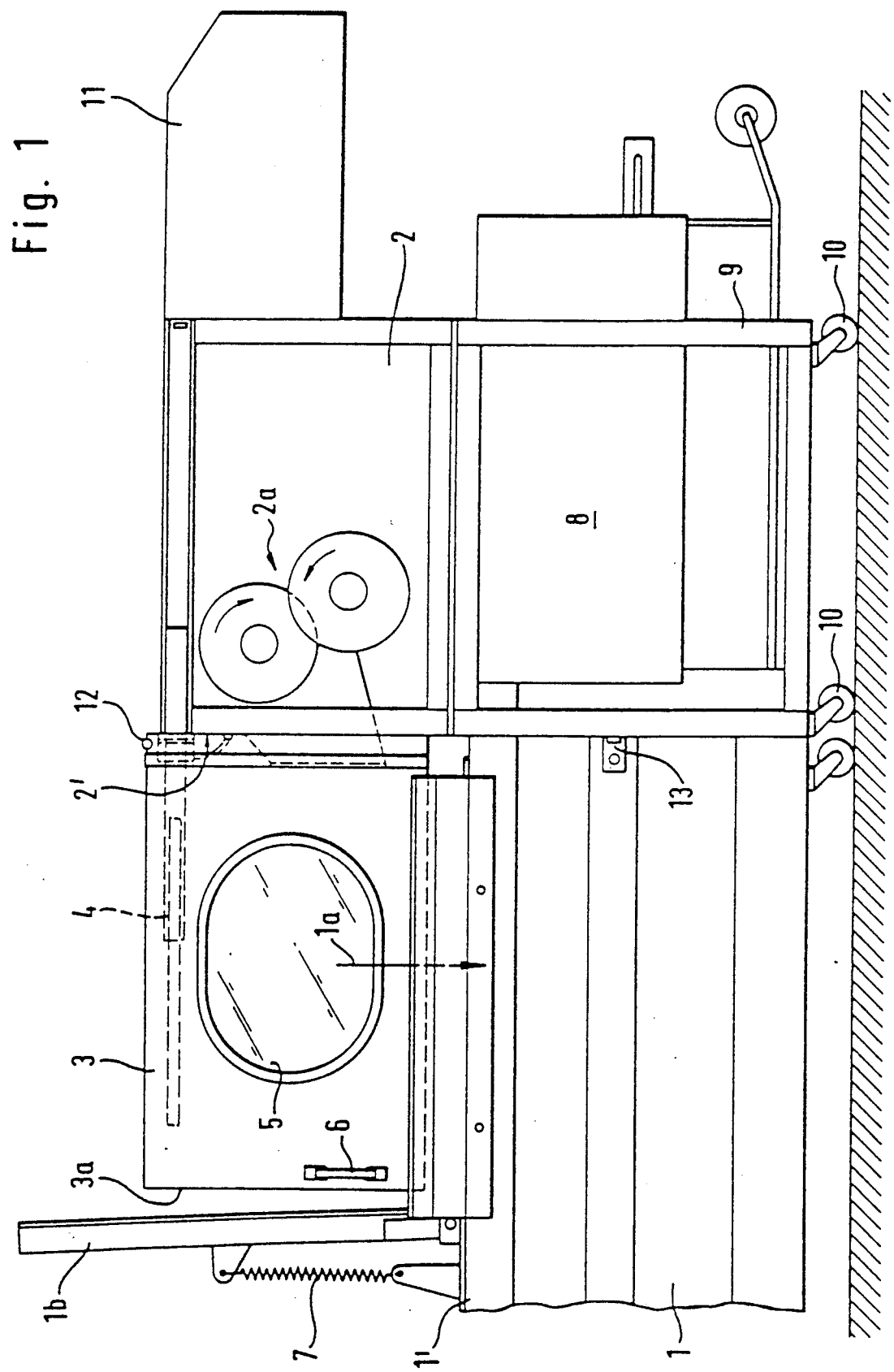

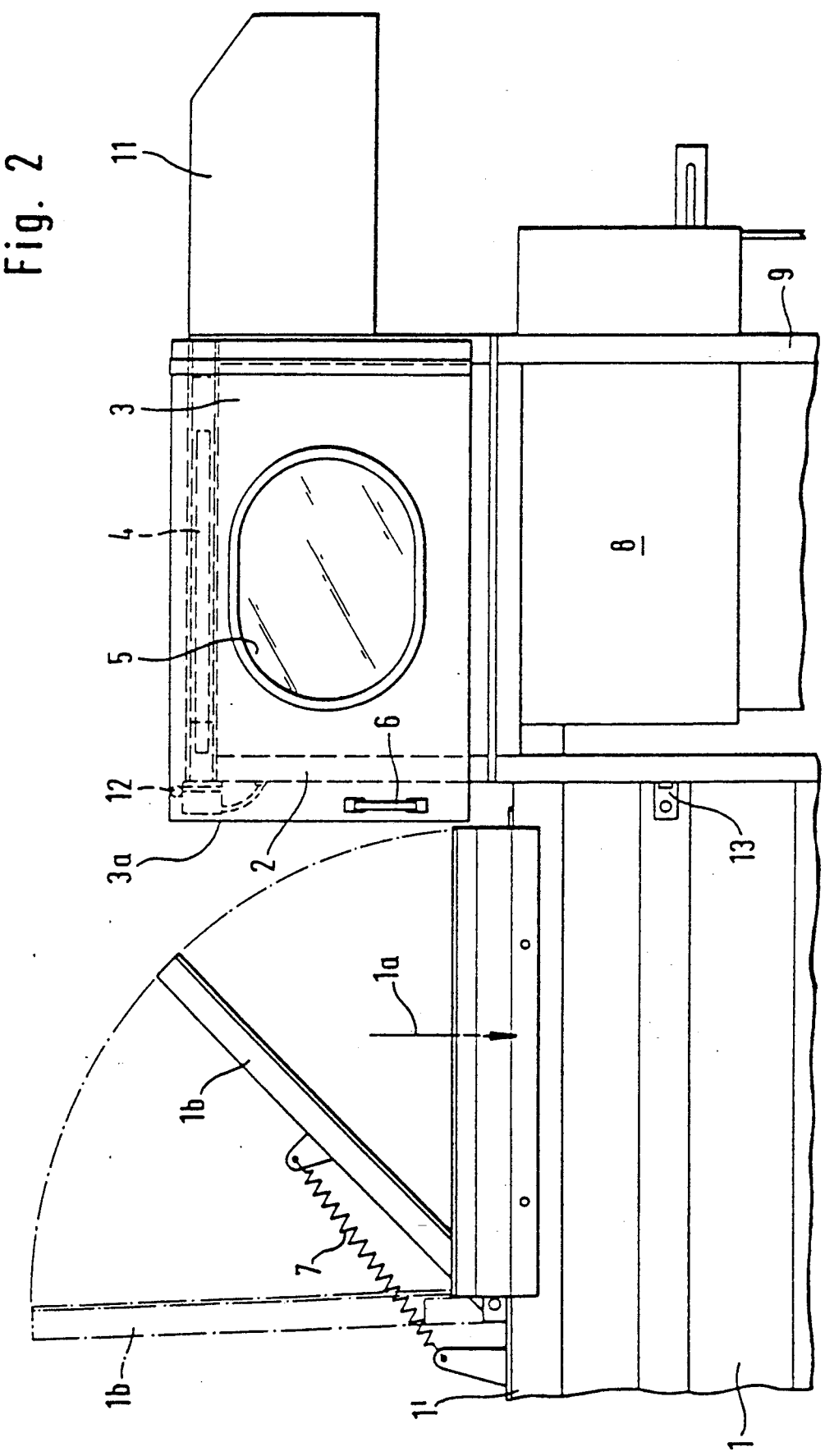

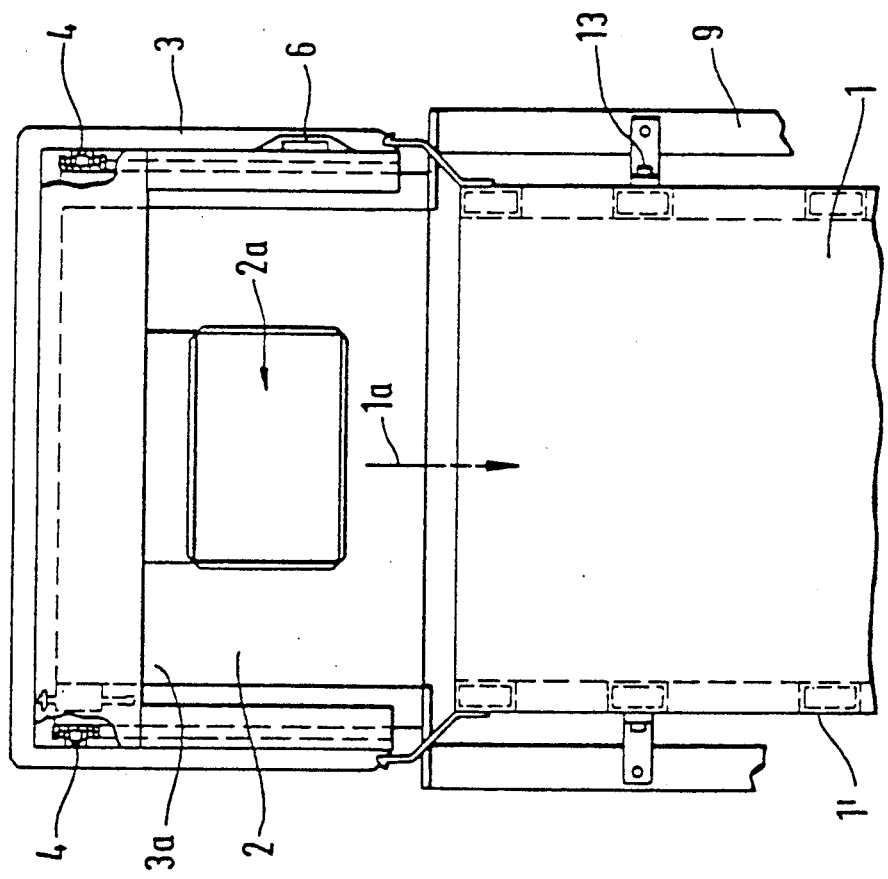

SHREDDER AND COMPACTOR WITH PROTECTIVE GUARD

BACKGROUND OF THE INVENTION

1. Field of the Invention

This invention relates to shredders and compactors and, more specifically, to shredders and compactors which may be connected to one another and employ a movable guard to reduce the risk of injury to a person operating the shredder and compactor.

2. Description of the Prior Art

The present invention relates to a protective cover for a shredder which is attached to a bailing press or compactor. Currently, problems exist with the satisfactory delivery of shredded materials from a shredder to a compactor and, at the same time, maintain protection of the hands of the operating personnel from the cutting elements of the shredder. The present invention provides solutions to the present problems.

Frequently, it is convenient to connect a side discharge type shredder to a top loading compactor. By attaching the two units together, shredded material may be directly discharged into the compactor, thereby eliminating the additional step of collecting the shredded material and manually loading it into the compactor. However, the cutting blades of such shredders are accessible even when the shredder is operating. Therefore, a risk exists that a person could place a hand or an arm into the discharge shoot of the shredder and be severely injured by the cutting blades.

It would be convenient to permanently mount a shroud which would enclose the area between the discharge chute of the shredder and the loading shoot of the compactor. However, such compactors, frequently, employ a lid which must be opened when material is being loaded into the compactor and then closed for operation of the compactor. A permanently placed shroud would prevent the lid of the compactor from being opened and closed.

Therefore, a need exists for a combined shredder and compactor unit which employs a moveable shroud which could close the area between the discharge chute of the shredder and the loading chute of the compactor when the shredder is in use and be moved away from the area between the discharge chute of the shredder and the loading chute of the compactor so that the compactor lid may be closed for compactor operation when the shredder is turned off. A need also exists for an interlock switch that would prevent operation of the shredder if the shroud were not in position to close the area between the discharge chute of the shredder and the loading chute of the compactor.

OBJECT OF THE INVENTION

It is an object of the invention to provide a shredder and compactor which may be removably connected together and includes a protective shroud or shield which assumes a position to limit access to the cutting blades of the shredder while the shredder is operating and which assumes a position which allows the compactor to operate when shredded material is to be compacted.

SUMMARY OF THE INVENTION

The invention provides an apparatus for shredding and compacting material which includes a shredder having an entry port for receiving the material, a shredding device for shredding the material and an exit port device for discharging the shredded material. Also provided is a compactor, for being detachably connected to the shredder device, which includes an inlet port for receiving the shredded material and a compacting device for compacting the shredded material. Further provided is a guard for being movably positioned with respect to the shredder and the compactor and capable of assuming a retracted position for allowing access to the exit port of the shredder and the inlet port of the compactor. The guard is also capable of assuming an extended position for limiting access to the exit port of the shredder and the inlet port of the compactor.

In summary, one aspect of the invention resides broadly in an apparatus for shredding and compacting material comprising: a shredder device with an entry port apparatus for receiving the material, a shredding device for shredding the material and an exit port apparatus for discharging the shredded material: a compactor device for being detachably connected to the shredder device, comprising an inlet port apparatus for receiving the shredded material and a compacting device for compacting the shredded material; and a guard device for being movably positioned with respect to the shredder device and the compactor device, and capable of assuming a retracted position for allowing access to the exit port apparatus of the shredder device and the inlet port apparatus of the compactor device and the guard device capable of assuming an extended position for limiting access to the exit port apparatus of the shredder device and the inlet port apparatus of the compactor device.

BRIEF DESCRIPTION OF THE DRAWINGS

The following Description of the Preferred Embodiments may be better understood when taken in conjunction with the appended drawings in which;

FIG. 1 is a side elevational view, partly in section, of a shredder and compactor which employs the present invention:

FIG. 2 is a partial side elevational view, partly in section, of a shredder and compactor which employs the present invention; and FIG. 3 is a partial top view of a shredder and compactor employing the present invention.

DESCRIPTION OF THE PREFERRED EMBODIMENTS

The present invention provides cover or bonnet 3 which covers loading chute door 1a almost completely during the operation of shredder 2 by drive 8. Open end 3a of cover 3 is positioned adjacent opened loading chute door 1b of press or compactor 1 during the operation of shredder 2.

Cover 3 is adapted to be slid sideways on extendible rails 4 which are attached to the housing of shredder 2. The position of cover 3, as shown in FIGS. 1 and 3, is the position cover 3 assumes when shredder 2 is operating to shred material. Door 1b of compactor 1 is held open by tension spring 7 to allow for the receipt of the shredded material directly from shredder 2 into compactor chute 1a. In this position, external access to cutter 2a is limited by cover 3. FIG. 2 illustrates the position cover 3 assumes when shredder 2 is not operating. When shredder 2 is not operating it is, therefore, not necessary to limit access to cutter 2a. This allows door 1b to be closed, thereby allowing operation of compactor 1.

A further feature of the invention is that cover 3 may have viewing window 5 and, for sliding cover 3 on rails 4, handle 6. Wheels 10 allow for the easy transport of the shredder and compactor. Storage bin 11 provides a convenient location for storing materials to be shredded in the future.

The present invention provides interlock-type switch 12 which prevents shredder 2 from operating unless cover 3 is positioned over compactor 1 in the position shown in FIG. 1. Switch 13 may be provided for turning compactor 1 and/or shredder 2 on and off. This switch 13 may also function as an interlock switch to prevent operation of the entire unit unless both the half with the motor, that is, the press drive 8, is connected to the drive compactor 1 in the movable unit shown on the left. Otherwise the press drive 8 will generally not operate in an embodiment of the invention. Frame 9 may be provided for supporting compactor 1 and shredder 2. Also, interlock switch 12 disables shredder 2 if cover 3 is moved from the position shown in FIGS. 1 and 3 while shredder 2 is operating.

Additionally, the following features of the invention may also be provided: cover 3 may be articulated on the face side of cutter 2a of the housing of shredder 2 and may be capable of being lifted up. Also, cover 3 may be attached longitudinally to the press chute, and may have an analog switching circuit.

Also, cover 3 is positioned in relationship to the loading chute door 1b during the operation of shredder 2, so that the hands of the operating personnel cannot reach into the area of the discharge cutter 2a of shredder 2 and so that cutter 2a is immediately without power if cover 3 is moved from the position shown in FIG. 1.

Patents relating to shredders include U.S. Pat. No. 4,830,295, entitled "Knife Roller For Paper Shredder;" U.S. Pat. No. 4,821,967 entitled "Paper Shredder, Paper Feeding System;" U.S. Pat. No. 4,815,670, entitled "Shredder;" U.S. Pat. No. 4,688,730, entitled "Paper Shredder And Method Of Making The Same;" U.S. Pat. No. 4,657,192, entitled "Paper Shredder;" U.S. Pat. No. 4,625,925, entitled "Comminuting Apparatus For Sheet Material Or Sheet Material Layers;" U.S. Pat. No. 4,562,971, entitled "Roller System For Paper Shredders;" U.S. Pat. No. 4,768,432, entitled "Office Paper Shredder And Compactor" and U.S. Pat. No. 4,330,092, entitled "In-Line Shredder Apparatus."

Patents relating to compactors include U.S. Pat. No. 3,991,668 entitled "Shredder-Compactor Apparatus For Processing Refusdomaterial;" U.S. Pat. No. 4,424,740, entitled "Compactor Safety Interlock Mechanism;" U.S. Pat. No. 4,817,520, entitled "Compactor With Control Apparatus For Offsetting Operation Between A Gate And A Ram;" U.S. Pat. No. 4,470,747, entitled "Separated Discards Carrier With Safety Features;" U.S. Pat. No. 4,425,070, entitled "Separated Discards Carrier;" U.S. Pat. No. 4,170,390, entitled "Paper Towel Dispenser;" U.S. Pat. No. 4,164,229, entitled "Portable Cigarette Making Machine;" U.S. Pat. No. 4,148,255, entitled "Baling Machine;" U.S. Pat. No. 4,109,571, entitled "Refuse Compaction Method;" U.S. Pat. No. 3,871,271, entitled "Method Of Manufacturing Compacter Bags" and U.S. Pat. No. 4,732,331, entitled "Sonic Compactor."

Patents relating to protective devices for shredders include U.S. Pat. No. 4,290,545, entitled "Method Of Attaching A Protective Cap To A Shredder Component" and U.S. Pat. No. 4,222,530, entitled "Replaceable Protective Means For End Disc Of Shredder."

In summary the invention includes a protective cover for a bailing press or compactor 1 combined with shredder 2 whereby the latter on the face-side and preferably above the loading opening 1a of the press 1 is attached in a separable manner, and is characterized by the fact that the cover is developed into a bonnet 3 or similar, so that during the start-up of the shredder 2 the loading opening 1a of press 1 is almost fully covered.

The bonnet 3 can be moved horizontally on telescoping extendible rails 4 which are attached to shredder housing 2 and during use as press only gets pushed over the shredder 2.

During the use of the shredder 1, the open end 3a of the cover bonnet 3 almost reaches to the open loading chute door 1b of press 1.

The switching connection between press 1 and shredder 2 is arranged in such a form that cutter 2a of bailing press 1 can only be switched on if cover bonnet 3 is located completely over the loading opening of 1a of the press 1 while the loading door 1b is open simultaneously.

Other variation possibilities include the cover bonnet 3 being articulated to the face side of the cutting mechanism 2' of the shredder housing in an upward folding manner.

Another variation possibility includes cover bonnet 3 being attached to one of the longitudinal press chute sides 1' in a laterally releasable form both of these variations having an analog switching connection as outlined above.

Also, the cover bonnet 3 has at least one lateral that 1 viewer window 5 and handle 6 which can either be a sliding or pivoting handle respectively.

All of the patents, patent applications, and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for shredding and compacting material comprising:
   a shredder having a material inlet port and a material outlet port;
   a compactor having a material entry port and a door movable between an opened position for facilitating access to said material entry port of said compactor and a closed position for operating said compactor and for limiting access to said material entry port of said compactor, said material entry port of said compactor being adjacent said material outlet port of said shredder to receive shredded material therefrom;
   a cover defining a side opening;
   said cover being slidable on said shredder to a compactor operating position thereby facilitating moving said door to said closed position for operating said compactor;
   said cover being slidable on said shredder to a shredder operating position to cover said material entry port of said compactor when said door is in said opened position for operating said shredder wherein access to said material outlet port of said shredder and said material entry port of said compactor is restricted by said cover.

2. The apparatus of claim 1, wherein said shredder includes interlocking means so that said shredder will shred the material only when said door is in said shredder operating position.

3. The apparatus of claim 2, wherein said door can assume said closed position only when said cover is in said compactor operating position.

4. The apparatus of claim 3, wherein said shredder and said compactor are portable.

5. The apparatus of claim 4, wherein said shredder and said compactor are positioned on wheel means.

6. The apparatus of claim 5, wherein said cover includes window means for allowing visual access through said cover.

* * * * *